(12) United States Patent
Wei et al.

(10) Patent No.: US 12,083,855 B2
(45) Date of Patent: Sep. 10, 2024

(54) PLATE IHX AS MOUNTING PLATE FOR REFRIGERANT MODULE

(71) Applicant: MAHLE International GmbH, Stuttgart (DE)

(72) Inventors: Lawrence Wei, Royal Oak, MI (US); Mandar Ahir, Shelby Township, MI (US); Thomas Bruder, Rochester Hills, MI (US)

(73) Assignee: MAHLE International GmbH, Stuttgart (DE)

( * ) Notice: Subject to any disclaimer, the term of this patent is extended or adjusted under 35 U.S.C. 154(b) by 0 days.

(21) Appl. No.: 17/543,828

(22) Filed: Dec. 7, 2021

(65) Prior Publication Data

US 2023/0173874 A1 Jun. 8, 2023

(51) Int. Cl.
*B60H 1/00* (2006.01)

(52) U.S. Cl.
CPC ..... *B60H 1/00328* (2013.01); *B60H 1/00278* (2013.01); *B60H 1/00392* (2013.01); *B60H 1/00521* (2013.01)

(58) Field of Classification Search
CPC ............ B60H 1/00328; B60H 1/00278; B60H 1/00392; B60H 1/00521; B60H 1/00342; F28D 9/00
USPC .......................................................... 62/239
See application file for complete search history.

(56) References Cited

U.S. PATENT DOCUMENTS

| 4,429,547 | A  | * | 2/1984  | Granryd    | F24D 3/18   |
|           |    |   |         |            | 62/183      |
| 6,539,746 | B1 | * | 4/2003  | Haussmann  | F28D 1/0461 |
|           |    |   |         |            | 62/509      |
| 7,762,090 | B2 | * | 7/2010  | Lee        | B01D 5/009  |
|           |    |   |         |            | 165/113     |
| 9,851,154 | B2 | * | 12/2017 | Kim        | F28D 9/005  |
| 10,066,878| B2 | * | 9/2018  | Huang      | F25B 40/00  |
| 10,449,832| B2 | * | 10/2019 | Lee        | F28F 3/086  |
| 10,618,372| B2 | * | 4/2020  | Kim        | F28F 9/002  |
| 11,014,425| B2 | * | 5/2021  | Erlandsson | F25B 39/04  |
| 2006/0053833 | A1 | * | 3/2006 | Martins  | F25B 39/04  |
|           |    |   |         |            | 62/507      |
| 2007/0267169 | A1 | * | 11/2007 | Acre    | F28D 9/0093 |
|           |    |   |         |            | 165/42      |

(Continued)

FOREIGN PATENT DOCUMENTS

CN     108349350 A  *  7/2018   ......... B60H 1/00521
DE     10160380 A1     6/2003

(Continued)

*Primary Examiner* — Ljiljana V. Ciric
(74) *Attorney, Agent, or Firm* — Dickinson Wright PLLC

(57) ABSTRACT

An internal heat exchanger (IHX) assembly for use in a vehicle includes at least three plates joined together to form two or more separate compartments or channels and at least one flat structure on an external surface of the IHX assembly. One compartment or channel contains a high pressure fluid and the other compartment or channel contains a low pressure fluid. The compartment or channel containing the high pressure fluid is in thermal communication with the compartment or channel containing the low pressure fluid, such that heat is transferred from the high pressure fluid to the low pressure fluid. The IHX assembly acts as a structural member in the vehicle upon which one or more refrigerant components are mounted onto the flat structure.

18 Claims, 2 Drawing Sheets

(56) References Cited

U.S. PATENT DOCUMENTS

| | | | | |
|---|---|---|---|---|
| 2009/0087355 A1* | 4/2009 | Ashe | ............... | F28D 9/00 422/600 |
| 2010/0243200 A1* | 9/2010 | Baker, Jr. | ............... | F28D 9/005 165/41 |
| 2012/0222846 A1* | 9/2012 | Kadle | ............... | F25B 39/04 165/166 |
| 2012/0234523 A1* | 9/2012 | Jouanny | ............... | F28F 9/0246 165/166 |
| 2012/0273179 A1* | 11/2012 | Tiziano | ............... | F28D 9/005 165/166 |
| 2012/0291478 A1* | 11/2012 | Kim | ............... | F25B 39/04 62/507 |
| 2013/0145789 A1* | 6/2013 | Kim | ............... | F28D 9/005 62/506 |
| 2013/0146257 A1* | 6/2013 | Kim | ............... | F28D 9/005 165/104.21 |
| 2013/0146265 A1* | 6/2013 | Kim | ............... | F25B 39/04 165/166 |
| 2014/0102682 A1* | 4/2014 | Kim | ............... | F28D 9/005 165/164 |
| 2014/0110093 A1* | 4/2014 | Kim | ............... | B60H 1/00342 165/164 |
| 2019/0039440 A1* | 2/2019 | Calderone | ............... | B60K 7/0007 |
| 2022/0388374 A1* | 12/2022 | Calderone | ............... | B60H 1/3223 |

FOREIGN PATENT DOCUMENTS

| | | | | |
|---|---|---|---|---|
| DE | 102013217287 A1 | | 3/2014 | |
| DE | 112013004804 T5 | * | 7/2015 | ............... B23P 15/26 |
| DE | 102018128401 A1 | * | 5/2019 | ......... B60H 1/00278 |
| DE | 102012105644 B4 | * | 5/2021 | ............... B60H 1/00 |
| DE | 112015000465 B4 | * | 9/2022 | ......... B60H 1/00335 |
| DE | 102012113213 B4 | * | 3/2024 | ............... B60H 1/32 |
| JP | 2013119373 A | * | 6/2013 | ......... B60H 1/00342 |
| KR | 101902684 B1 | * | 9/2018 | |
| WO | WO-2006120026 A2 | * | 11/2006 | ............ B01J 19/249 |
| WO | WO-2013071143 A1 | * | 5/2013 | ......... B60H 1/00278 |
| WO | WO-2020022726 A1 | * | 1/2020 | ......... B60H 1/00342 |

* cited by examiner

PLATE IHX AS MOUNTING PLATE FOR REFRIGERANT MODULE

FIELD

This disclosure relates generally to an internal heat exchanger (IHX) assembly. More specifically, this disclosure relates to an IHX assembly used in a vehicle, which is configured to provide structural integrity and support for the mounting of various refrigerant components thereon.

BACKGROUND

The statements in this section merely provide background information related to the present disclosure and may not constitute prior art.

Electric vehicles (EV) represent one of the most promising alternatives to conventional vehicles that use internal combustion engines. Since a rechargeable battery is the main component in an electric vehicle, it accounts for a significant proportion of the cost, mileage, and safety exhibited by the vehicle. In order to extend the distance or mileage that the vehicle may incur prior to requiring recharging and to increase the overall safety of the vehicle, it is necessary to efficiently monitor and control thermal conditions in order to ensure that the battery remains within its optimum operating temperature range. Vehicle manufacturers use such thermal management to heat and cool the battery within the operating temperature condition of 70° C.±10° C., while also maintaining a cell-to-cell temperature zone variation in the range of 3° C. to 5° C.

In order to control the cost associated with manufacturing and operating an electric vehicle (EV), the need to cool the battery necessitates the use of the vehicle's refrigerant system. Such refrigerant systems generally comprise the circulation of a liquid refrigerant or coolant in order to provide a means to cool various drivetrain components, electronic modules, and other sections of the vehicle, such as the passenger compartment. In order to increase efficiency and reduce the complexity of the routing associated with refrigerant lines, these refrigerant systems utilize an internal heat exchanger (abbreviated as IHX) integrated into a refrigerant module, often referred to as an "in a box" package. The commercially available internal heat exchangers used in these packages are generally in an extruded co-tube form, although a stack-plate arrangement may also be considered. However, although these "in a box" packages integrate an internal heat exchanger (IHX) into a package solution, these packages do incorporate the function of the IHX to serve as both a heat exchanger and as a structural component upon which other components may be mounted.

SUMMARY

The present disclosure generally provides an internal heat exchanger (IHX) assembly for use in a vehicle configured to provide structural integrity and support the mounting of various components thereto. This IHX assembly generally comprises at least three plates joined together to form two or more separate compartments or channels and at least one flat structure on an external surface of the IHX assembly. One of the compartments or channels contains a high pressure fluid, while another compartment or channel contains a low pressure fluid. The compartment or channel that contains the high pressure fluid is in thermal communication with the compartment or channel that contains the low pressure fluid, such that heat is transferred from the high pressure fluid to the low pressure fluid. The low pressure fluid and the high pressure fluid are independently selected to be a refrigerant or a coolant in liquid or gaseous (e.g., vapor) form. The at least three plates may be joined together by being brazed, soldered, adhesively bonded, or welded.

The IHX assembly acts as a structural member in the vehicle upon which one or more refrigerant components may be mounted onto a flat structure formed on an external surface by one or more of the plates. These refrigerant components may include, without limitation, a chiller, an indirect condenser, a receiver or dryer, an accumulator, a flow control device, or a combination thereof.

According to another aspect of the present disclosure, the at least three plates are arranged in the following successive order from top to bottom: a low pressure flow plate, a heat spreader plate, and a high pressure flow plate. The low pressure flow plate forms a portion of the compartment or channel that contains the low pressure fluid. The heat spreader plate forms a portion of the first and second chambers, such that the heat spreading plate conducts the heat transferred from the high pressure fluid to the low pressure fluid. The high pressure flow plate forms a portion of the compartment or channel that contains the high pressure fluid. When desirable, the low pressure flow plate may comprise one or more low pressure vapor channels, while the high pressure flow plate may be independently selected to include at least one high pressure liquid channel.

According to another aspect of the present disclosure, the IHX assembly may include a fourth plate. This fourth place comprises a reinforcement plate configured to provide structural reinforcement and to form at least one of the one or more flat structures upon which the at least one refrigerant component is mounted. The reinforcement plate may be either integrally formed with the low pressure flow plate or provided as a separate mounting plate or bracket fastened thereto.

According to yet another aspect of the present disclosure, a vehicle is provided that includes a refrigerant system containing the internal heat exchanger (IHX) assembly as described above and further defined herein. This vehicle may be an electric vehicle (EV) powered by a battery, wherein the refrigerant system is configured to cool the battery.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 2A:
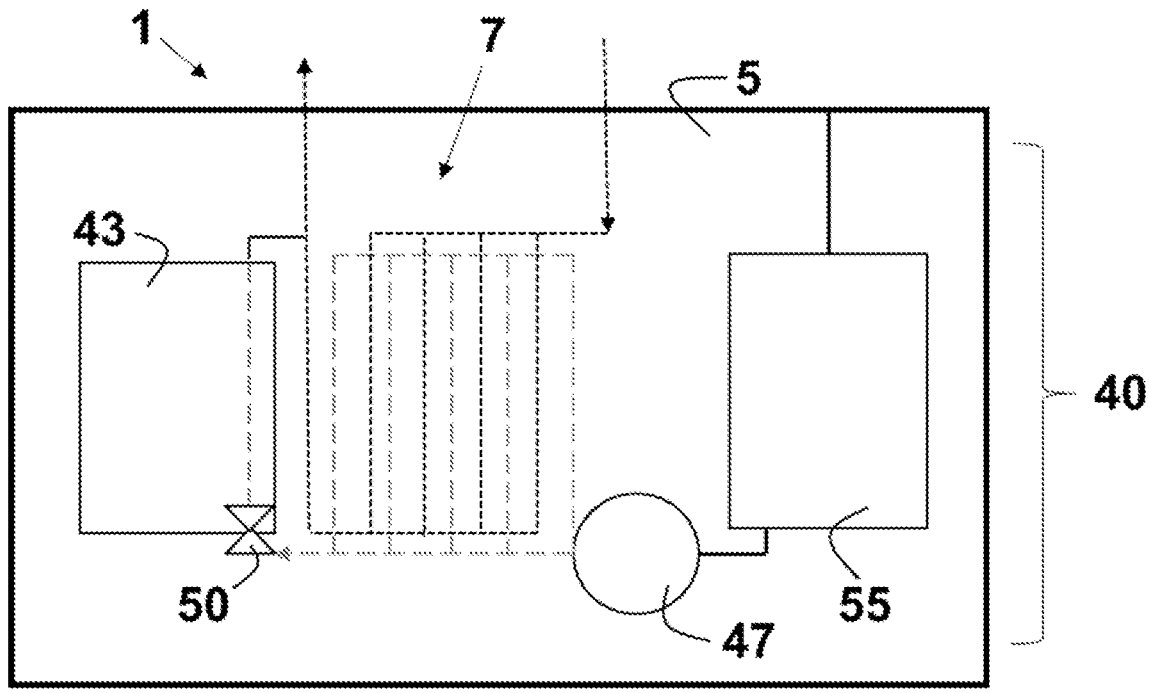
Figure 2B:
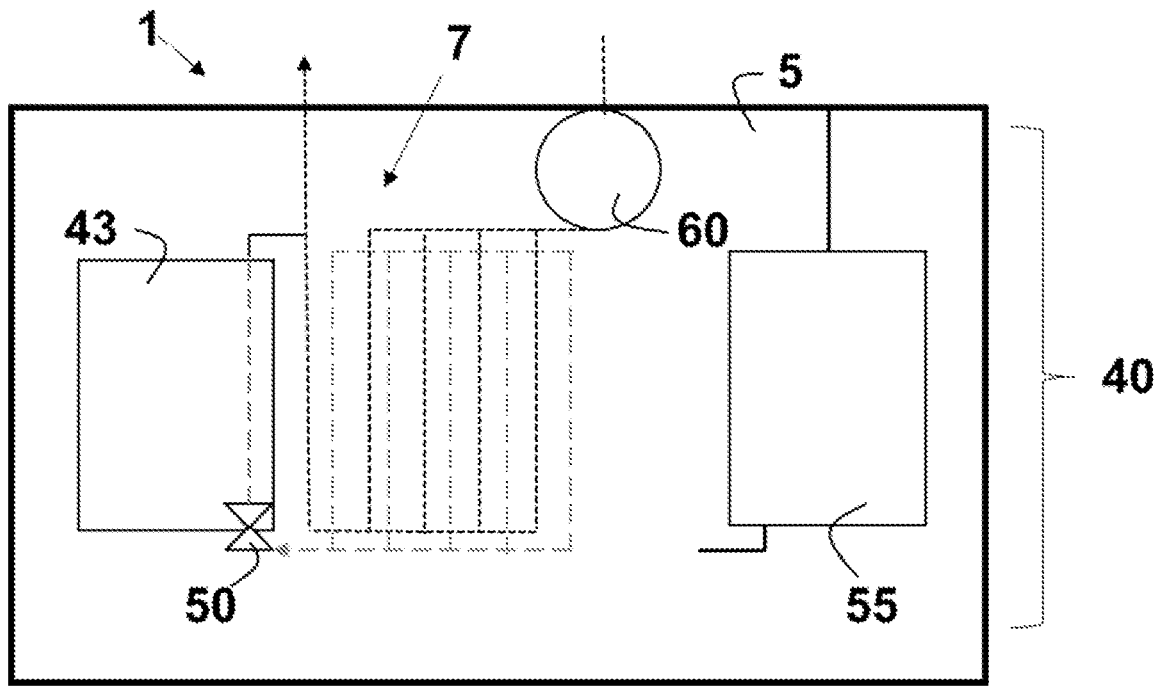

FIG. 2A is a top-down schematic representation of a plate-type internal heat exchanger (IHX) assembly demonstrating the mounting of one or more refrigerant components thereon according to the teachings of the present disclosure; and FIG. 2B is another top-down schematic representation of a plate-type internal heat exchanger (IHX) assembly demonstrating the mounting of one or more refrigerant components thereon according to the teachings of the present disclosure.

The drawings described herein are for illustration purposes only and are not intended to limit the scope of the present disclosure in any way. It should be understood that throughout the description, corresponding reference numerals indicate like or corresponding parts and features.

DETAILED DESCRIPTION

The following description is merely exemplary in nature and is in no way intended to limit the present disclosure or its application or uses. For example, the internal heat exchanger (IHX) assembly made and used according to the teachings contained herein are described throughout the present disclosure in conjunction with a vehicle, such as an electric vehicle (EV). The incorporation and use of such an IHX assembly in other heating, ventilation, air conditioning, and refrigeration applications wherein an internal heat exchanger (IHX) assembly would be desirable is contemplated not to exceed the scope of the present disclosure.

For the purpose of this disclosure, the terms "at least one" and "one or more of" an element are used interchangeably and may have the same meaning. These terms, which refer to the inclusion of a single element or a plurality of the elements, may also be represented by the suffix "(s)" at the end of the element. For example, "at least one plate", "one or more plates", and "plate(s)" may be used interchangeably and are intended to have the same meaning.

Although specific terminology is used herein to describe particular embodiments within the disclosure, this terminology is not intended to limit any portion of the disclosure. For example, as used herein, singular forms of "a", "an", and "the" are intended to include various plural forms as well, unless the context of their use clearly indicates otherwise. Terms, such as "comprises", "includes" "comprising" or "including" are meant to specify the presence of stated features, integers, steps, operations, elements, and/or components, but are not meant to preclude the presence and/or addition of one or more other features, integers, steps, operations, elements, components, and/or groups associated therewith.

The present disclosure addresses the deficiency of the prior art by providing a design of an integrated heat exchanger (IHX) assembly that is robust enough to serve as a structural member for components to be mounted thereto. As an interface between the high-side and low-side pressure regions of the refrigerant system, this IHX assembly serves as a central component or feature for many under-the-hood components in a vehicle. The IHX assembly combines the functionality of an integrated heat exchanger with a reduction in the number and size of refrigerant lines present in a distribution manifold.

The present disclosure provides an integrated solution by utilizing the layered plate internal heat exchanger (IHX) as a structural member that enables the assembly of a refrigeration module. The plate-type internal heat exchanger comprises a minimum of at least three plates forming multiple layers within the assembly. These at least three plates may be joined together by being brazed (e.g., via vacuum brazing, controlled atmospheric brazing, etc.), soldered, adhesively bonded, or welded, to name a few of the available joining methods. A high pressure fluid may be located in one layer that is in thermal contact and thus transferring heat to a low pressure fluid present in another separate layer. Alternatively, both fluids may be in the same layer, but located in different flow channels, thereby, allowing heat to be conducted through the material(s) forms the wall(s) that separate the different flow channels. The internal heat exchanger (IHX) assembly is configured to act as a structural member providing structural integrity and at least one large flat structure on an external surface of the IHX assembly to which refrigerant components may be mounted or secured.

Figure 1A:
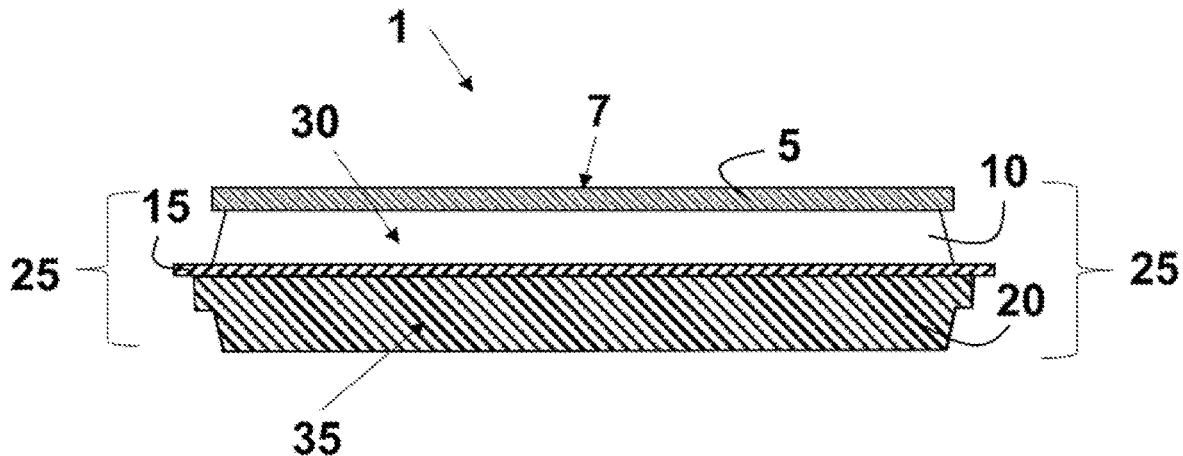
FIG. 1A is a schematic representation of a plate-type internal heat exchanger (IHX) assembly formed according to the teachings of the present disclosure shown from a side-view perspective.
Figure 1B:
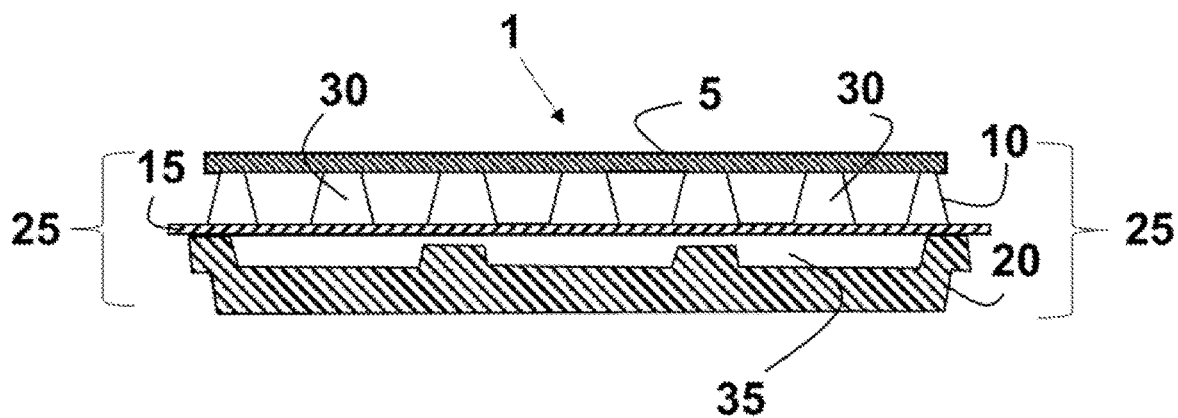
FIG. 1B is a cross-sectional view of the internal heat exchanger (IHX) assembly of FIG. 1A according to the teachings of the present disclosure.

Referring to FIGS. 1A and 1B, an example of an IHX assembly 1 is shown that incorporates four plates 5, 10, 15, 20 joined together to form two or more separate compartments or channels 30, 35 and at least one flat surface 7 on an external surface of the IHX assembly 1. Alternatively, the number of separate compartments 30, 35 in the IHX assembly 1 is two.

As shown in FIG. 1A, one compartment or channel 35 contains a high pressure fluid and the other compartment or channel 30 contains a low pressure fluid. The high pressure fluid and the low pressure fluid may be independently selected to be refrigerant or a coolant in liquid or gaseous (including vapor) form. The compartment or channel 35 containing the high pressure fluid is in thermal communication with the compartment or channel 30 containing the low pressure fluid, such that heat is transferred from the high pressure fluid to the low pressure fluid. The IHX assembly 1 acts as a structural member in the vehicle upon which one or more refrigerant components (best shown in FIGS. 2A & 2B) are mounted onto a flat structure 7. One skilled in the art will understand that there may be only three layers or additional layers in excess of the layers shown in FIG. 1A to accommodate one of or both of the low and high pressure fluids depending on the performance needs and/or requirements.

Referring again to FIGS. 1A and 1B, the IHX assembly 1 may comprise at least three plates arranged in the following successive order from top to bottom: a low pressure flow plate 10, a heat spreader plate 15, and a high pressure flow plate 20. The low pressure flow plate forms a portion of the compartment or channel 30 that contains the low pressure fluid. The high pressure flow 20 forms a portion of the compartment or channel 35 that contains the high pressure fluid. The heat spreader plate 15 forms a portion of the first and second chambers 30, 35 and separates the first and second chambers 30, 35 from each other, such that the heat spreader plate 15 conducts the heat transferred from the high pressure fluid to the low pressure fluid. The low pressure flow plate 10 may be configured internally to comprise one low pressure vapor compartment 30 (FIG. 1A) or a plurality low pressure vapor channels 30 (FIG. 1B). Similarly, the high pressure flow plate 30 may be internally configured to comprise one high pressure liquid compartment 35 (FIG. 1A) or a plurality of high pressure liquid compartments 35 (see FIG. 1B)

Still referring to FIGS. 1A and 1B, the IHX assembly 1 may further include a fourth plate. This fourth plate may be a reinforcement plate 5 configured to provide structural reinforcement and to form at least one of the one or more flat structures 7 upon which the at least one refrigerant component is mounted. The reinforcement plate 5 may be either integrally formed with the low pressure flow plate or is a separate mounting plate or bracket fastened thereto. The replacement plate 5 may also include one or more refrigerant ports or connections. One skilled in the art will understand that the refrigerant ports or connections may also reside elsewhere on the IHX assembly 1, such as for example, without limitation, on one or more sides 25 of the IHX assembly 1.

The plates used to form the various layers of the IHX assembly may be comprised entirely or partially of one or more metals, metal alloys, ceramics, composite materials, or a combination thereof. Several examples of metals and alloys formed therefrom may include, without limitation, aluminum, iron, chromium, copper, titanium, carbon steel, and stainless steel. Several examples of ceramic materials may include, but not be limited to alumina, mullite, zirconia, silicon nitride, and silicon carbide.

The low pressure and high pressure fluids may be independently selected to be, without limitation, a refrigerant or a coolant in either liquid or gaseous (e.g., including vapor) form. Several examples of refrigerants include, without limitation, a chlorofluorocarbon (CFC), a hydrochlorofluorocarbon (HCFC), a hydrofluorocarbon (HFC), a hydrocarbon (HC), or carbon dioxide. Several specific examples of commercially available refrigerants may include, but are not limited to, R134a, R1234yf, R407c, R410a R12, and R22 refrigerants.

Referring now to FIGS. 2A and 2B, the one or more refrigerant components 40 mounted on the flat structure 7 of IHX assembly 1 may comprise, without limitation, a chiller 43, an indirect condenser 55, a receiver or dryer 47, an accumulator 60, a flow control device 50, or a combination thereof. The flow control device 50 may include, but not be limited to, an expansion valve, a shut-off valve, or a flow control valve. The refrigerant components 40 may be mounted on the flat structure 7 using any type of fastening mechanism including, but not limited to bolts/threads, clips, clamps, brazing, soldering, welding, or adhesive bonding.

According to another aspect of the present disclosure, a vehicle is provided that includes a refrigerant system containing the internal heat exchanger (IHX) assembly as described above and further defined herein. This vehicle may be an electric vehicle (EV) powered by a battery, wherein the refrigerant system is configured to cool the battery.

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An internal heat exchanger assembly for use in a vehicle, the internal heat exchanger assembly comprising at least three plates joined together to form a first compartment or channel, a separate second compartment or channel, and one or more flat structures on an external surface of the internal heat exchanger assembly;

wherein the first compartment or channel contains a high pressure fluid and the second compartment or channel contains a low pressure fluid; the first compartment or channel containing the high pressure fluid is in thermal communication with the second compartment or channel containing the low pressure fluid, such that heat is transferred from the high pressure fluid to the low pressure fluid;

wherein one or more refrigeration system components are mounted onto the one or more flat structures;

wherein the at least three plates are arranged in succession from top to bottom as follows:

a low pressure flow plate that forms a portion of the second compartment or channel that contains the low pressure fluid;

a heat spreader plate; the heat spreader plate forming a portion of the first and second compartments or channels, such that the heat spreader plate conducts the heat transferred from the high pressure fluid to the low pressure fluid; and a high pressure flow plate that forms a portion of the first compartment or channel that contains the high pressure fluid.

2. The internal heat exchanger assembly according to claim 1, wherein the one or more refrigeration system components is selected from the group consisting of a chiller, an indirect condenser, a receiver or dryer, an accumulator, and a flow control device.

3. The internal heat exchanger assembly according to claim 2, wherein the flow control device is selected from the group consisting of an expansion valve, a shut-off valve, and a flow control valve.

4. The internal heat exchanger assembly according to claim 1, wherein the at least three plates are joined together by a process selected from the group consisting of brazing, soldering, adhesively bonding, and welding.

5. The internal heat exchanger assembly according to claim 1, wherein the internal heat exchanger assembly includes a fourth plate, the fourth place comprising a reinforcement plate configured to provide structural reinforcement and to form at least one of the one or more flat structures upon which the one or more refrigeration system components are mounted.

6. The internal heat exchanger assembly according to claim 5, wherein the reinforcement plate is integrally formed with the low pressure flow plate.

7. The internal heat exchanger assembly according to claim 5, wherein the internal heat exchanger assembly further comprises one or more refrigerant ports or connections that reside in the reinforcement plate or on one or more sides of the internal heat exchanger assembly.

8. The internal heat exchanger assembly according to claim 1, wherein the low pressure flow plate comprises one or more low pressure vapor channels.

9. The internal heat exchanger assembly according to claim 1, wherein the high pressure flow plate comprises at least one high pressure liquid channel.

10. The internal heat exchanger assembly according to claim 1, wherein the high pressure and low pressure fluids are independently selected to be a refrigerant in either liquid or gaseous form.

11. The internal heat exchanger assembly according to claim 1, wherein the at least three plates are selected from the group consisting of one or more metals, metal alloys, composites, and ceramics.

12. The internal heat exchanger assembly according to claim 1, wherein the internal heat exchanger assembly further comprises one or more refrigerant ports or connections.

13. A vehicle with a refrigeration system that includes an internal heat exchanger assembly comprising at least three plates joined together to form a first compartment or channel, a separate second compartment or channel, and one or more flat structures on an external surface of the internal heat exchanger assembly;
- wherein the first compartment or channel contains a high pressure fluid and the second compartment or channel contains a low pressure fluid; the first compartment containing the high pressure fluid is in thermal communication with the second compartment or channel containing the low pressure fluid, such that heat is transferred from the high pressure fluid to the low pressure fluid;
- wherein one or more refrigeration system components are mounted onto the one or more flat structures;
- wherein the at least three plates in the internal heat exchanger assembly are arranged in succession from top to bottom as follows:
- a low pressure flow plate that forms a portion of the second compartment or channel that contains the low pressure fluid;
- a heat spreader plate; the heat spreading plate forming a portion of the first and second chambers, such that the heat spreading plate conducts the heat transferred from the high pressure fluid to the low pressure fluid; and
- a high pressure flow plate that forms a portion of the compartment or channel that contains the high pressure fluid.

14. The vehicle according to claim 13, wherein the internal heat exchanger assembly includes a fourth plate, the fourth place comprising a reinforcement plate configured to provide structural reinforcement and to form at least one of the one or more flat structures upon which the at least one refrigeration system component is mounted.

15. The vehicle according to claim 13, wherein the one or more refrigeration system components is selected from the group consisting of a chiller, an indirect condenser, a receiver or dryer, an accumulator, and a flow control device;
- wherein the high pressure fluid and low pressure fluid are independently selected to be a refrigerant either in liquid or gaseous form.

16. The vehicle according to claim 13, wherein the low pressure flow plate in the internal heat exchanger assembly comprises one or more low pressure vapor channels and the high pressure flow plate in the internal heat exchanger assembly comprises at least one high pressure liquid channel.

17. The vehicle according to claim 13, wherein the vehicle is an electric vehicle.

18. The vehicle according to claim 13, wherein the at least three plates in the internal heat exchanger assembly are joined together by a process selected from the group consisting of brazing, soldering, adhesively bonding, or welding.

* * * * *